UNITED STATES PATENT OFFICE.

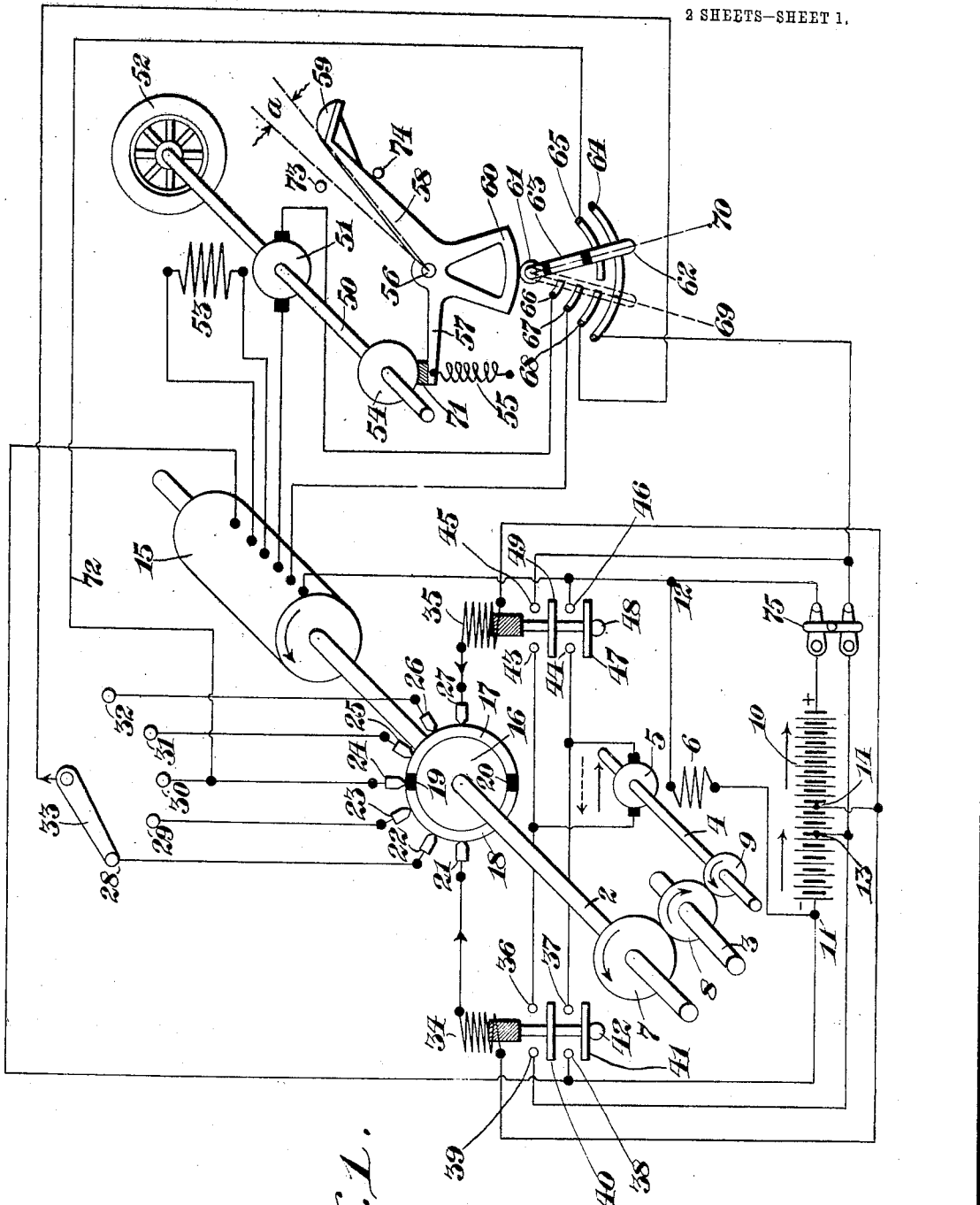

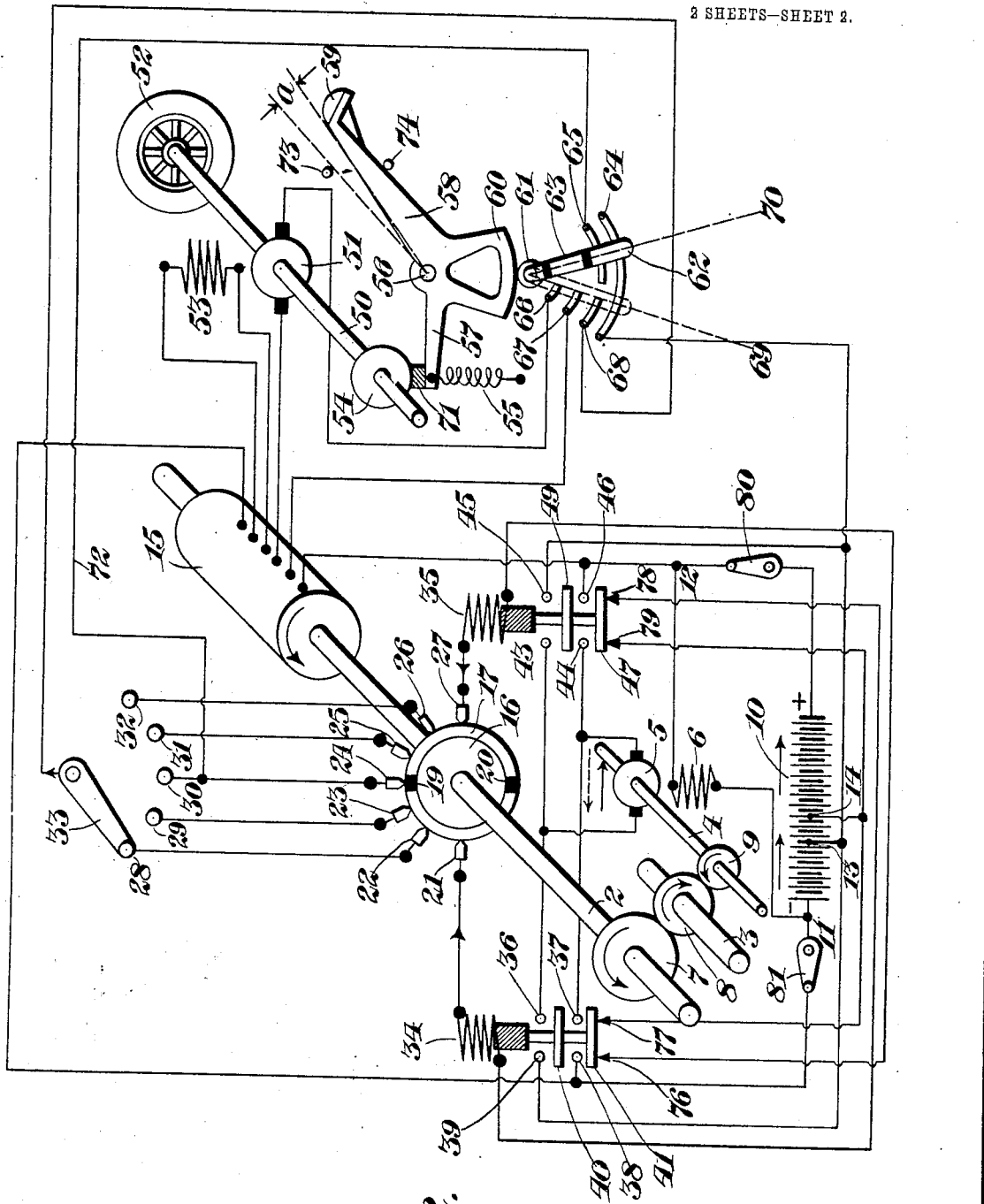

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SYSTEM OF ELECTRICAL CONTROL.

1,118,929. Specification of Letters Patent. Patented Dec. 1, 1914.

Application filed February 26, 1912. Serial No. 679,876.

*To all whom it may concern:*

Be it known that I, VALÈRE ALFRED FYNN, a subject of the King of England, residing at St. Louis, Missouri, have invented a certain new and useful System of Electrical Control, of which the following is such a full, clear, and exact description as will enable any one skilled in the art to which it appertains to make and use the same, reference being had to the accompanying drawings, forming part of this specification.

My invention relates to electrically-actuated controlling mechanism and connections therefor, and is particularly applicable to electrically propelled vehicles, making it possible for the driver to control his vehicle easily and positively.

The principal objects of my invention are to deprive the operator of power to unduly increase the rate of acceleration of the driving motor or to suddenly reverse it; to connect the mechanical brake-applying mechanism to controlling switches in the manner and for the purposes hereinafter explained; and to produce a control system in which currents carried by the master controlling circuits may be small and of low voltage.

In the drawings, Figure 1 diagrammatically illustrates one embodiment of my invention; Fig. 2 is similar to Fig. 1, but shows a different arrangement of connections between certain parts.

Referring to Fig. 1, 50 is the driven shaft, supposed in this example, to be the shaft of an automobile, one wheel of which is shown at 52. Mounted on this shaft 50, or geared to it in some convenient manner, is the main motor armature 51, operating in conjuction with the main field 53. The circuits of this main motor are adapted to be organized by a main controller in the usual manner for varying the speed and direction of motion. Mounted on the shaft 50 is a brake pulley 54 to which can be applied the brake shoe 71 carried by the arm 57 which is pivoted at 56. The brake shoe is normally held out of contact with the pulley 54 by means of spring 55, but can be forced into contact with said wheel by means of a pedal 59 on arm 58. This arm 58 is connected to the arm 57 and carries a segment 60 gearing with the pinion 61 to which is attached a switch lever carrying two insulated contact blades 62, 63, adapted to engage with the segmental contacts 64, 65, 66, 67 and 68.

The pedal arm 58 can travel through the angle *a*, its motion being limited by the two stops 73 and 74. When fully depressed, as shown in Fig. 1, the brake is applied and the switch blades 62 and 63 stand in the position 70 indicated in the figure. When released the brake block 71 is disengaged from the brake pulley 54 and the blades 62 and 63 occupy the position 69. Energy for the main motor is derived from a storage battery 10. This same source of energy is made use of for actuating the auxiliary or pilot motor which actuates the main controller. This auxiliary motor is mounted on the shaft 4, its armature being indicated at 5 and its field winding at 6. This field winding is connected across the terminals 11, 12, of the battery 10 and can only be disconnected by the double pole switch 75, which the operator or driver would usually open on leaving the vehicle. The armature 5 of this pilot motor can either be connected between the points 11, 13, or 12, 13, of the storage battery, depending on whether the solenoid 34 or 35 is energized. Since it will ordinarily be convenient to use a high speed pilot motor, it will be necessary to introduce reduction gear of some kind between the shaft 4 of said motor and the shaft 2 on which the drum of the main controller is mounted. In the figures, this is indicated by the gear wheels, 9, 8 and 7, the first being mounted on the shaft 4, the second on the counter-shaft 3, and the third on the drum-controller shaft 2. Mounted on this drum-controller shaft, or conveniently geared thereto, is a locating switch 16 comprising two segments 17 and 18, insulated from the hub and also from each other, the latter insulation being provided by means of the insulators 19 and 20. A number of stationary contacts 21 to 27 inclusive, are disposed along the periphery of the locating switch 16 and adapted to make connection either with the half-ring 17 or 18. Two of these, the contacts 21 and 27, are respectively connected to the solenoids 34 and 35, the other ends of these solenoids being joined together and connected to the point 14 of the storage battery 10. Contacts 22, 23, 24, 25 and 26 are in electrical connection with contacts 28, 29, 30, 31 and 32, respectively, forming part of the master controller, the movable lever of which is indicated at 33 and is connected to point 13 of the storage battery 10 by way of the segmental contact 68, the movable blade 62, the segmental contact 64, and one blade of the double pole switch 75. This arrangement enables any one of the contacts, 22 to 26 inclusive, and forming part of the locating switch, to be connected to point 13 of the storage battery when the foot pedal 59 is not depressed. Provision is also made for connecting contact 24 of the locating switch, to point 13 of the storage battery by means of the movable blade 62 and conductor 72, the arrangement being such that point 13 of the storage battery can either be directly connected to the lever 33, or directly to contact 24,—a simultaneous direct connection of point 13 to lever 33 and to contact 24 being preferably avoided.

The armature of the solenoid 34 carries the contact plates 40 and 41. When 34 is not energized, this armature rests on the support 42. Similarly, the armature of the solenoid 35 carries the contact plates 49 and 47, and rests on the support 48 when 35 is not energized. When solenoid 34 is energized, then the conducting plate 40 bridges the contacts 39 and 36, while the conducting plate 41 bridges the contacts 37 and 38. Similarly, the conducting plates 49 and 47 are adapted to bridge the contacts 43, 45 and 44, 46 respectively.

In describing the operation of the control system illustrated in the drawing, I will assume that the pedal 59 has been released by the operator and allowed to travel through the angle a,—the lever 58 then rests against the stop 73, being held in that position by the spring 55. The brake pulley 54 will thus be released; the main motor will be free to rotate, and the switch blades 62 and 63 will stand in position 69, as indicated in dotted lines. If the lever 33 of the main controller stands on point 28, then as soon as the pedal has been released in the manner described, solenoid 34 will be energized, the circuit through it being closed as follows: from point 13 of the storage battery through one blade of switch 75, to the segment 64, through blade 62 to segment 68 to lever 33, contact 28, contact 22, half-ring 18, contact 21, solenoid 34, and back to the storage battery at the point 14. The energizing of solenoid 34 will cause contacts 39 and 36 to be bridged by the conducting plate 40, and contacts 38 and 37 to be bridged by the contact plate 41, thus completing the armature circuit of the pilot motor as follows: from point 13 of the storage battery 10 to contact 39, to plate 40, contact 36, through the armature 5 to contact 37, plate 41, contact 38, and back to the storage battery at the terminal 11. The flow of current through the armature 5 from left to right will cause this armature to revolve in, say, a counter-clock direction, also driving the shaft of the main drum controller and the locating switch 16 in a counter-clock direction. This movement will continue until the insulator 19 comes to stand under contact 22, at which instant the circuit of the solenoid 34 will be broken and its armature released, thus breaking the armature circuit of the pilot motor and bringing the latter to rest. Had lever 33 been placed on point 29 instead of point 28, then the locating switch 16 could only have progressed in a counter-clock direction until the insulator 19 had come to stand opposite contact 23. The revolution of shaft 2 in a counter-clock direction so moves the drum of the main controller as to organize the circuits of the main motor in a manner which will propel the latter in a forward direction. When insulator 19 stands under point 23, the main drum controller is in a position which determines a certain forward speed of the main motor which is less than the maximum forward speed of that machine. When 19 is under point 22, the main controller 15 establishes the circuit or circuits for the maximum forward speed of the main motor. When 19 stands under contact 24, the main controller 15 is in its "off" position. A clock-wise rotation of 16 and of the main controller will place the latter in a position in which the circuits of the main motor will be so organized as to cause the latter to rotate in the opposite or backward direction. The speed of this backward rotation is increased when the controller comes to occupy a position in which 19 stands under contact 26. It is clear that the number of contacts on the locating switch and of corresponding main drum positions can be selected at will, and that some of the contacts of the locating switch can be made to correspond to main drum positions in which the circuits of the main motor are so organized as to cause that machine to act as an electro-dynamic brake. It will be seen that, with the pedal in its normal position, in which the brake is released, the operator or driver is able, by manipulating switch 33, to place the main drum controller in any desired position, thus causing the main motor either to stand still or to propel the vehicle in a forward or backward direction.

When the solenoid 34 is energized and shaft 2 is rotated in a counter-clock direction, then only about one-third of the total number of cells of the storage battery are in circuit with the pilot-motor armature, while about two-thirds of these cells are placed in circuit with the pilot-motor armature when solenoid 35 is energized. Since the field winding of the pilot motor is always connected across the full voltage of the storage battery, it is evident that the main controller 15 will be driven at one speed in a counter-clock direction, which corresponds to the acceleration of the main motor in a forward direction of rotation, and at another and higher speed in a clock-wise direction or when returning the main controller from the "full on forward" to the "off" position.

Assume that the pedal 59 is in its normal position, that the switch blades 62 and 63 are consequently in the position 69, and that the switch 16 has responded to the action of the driver, who placed switch 33 on point 28 by turning in a counter-clock direction until the insulator 19 stands under point 22, and, let it be supposed that the driver desires to suddenly arrest the progress of the vehicle. To do this, he must depress the pedal and bring the brake gear into the position shown in the drawing. It is not necessary for him to move the lever 33 of the master controller, even if he also wishes the main controller to be returned to its "off" position, for the application of the brake and the consequent movement of the blades 62 and 63 to the position 70 will not only stop the main motor mechanically by applying the brake shoe 71 to the brake wheel 54 and interrupt its electrical supply circuit at the points 66 and 67, but will also re-organize the connections controlling the solenoids 34 and 35 as to return the main controller to its "off" position. This is brought about as follows: Actuation of the brake opens the circuit through the lever 33 by causing blade 62 to pass out of contact with 68, and places contact 24 of the locating switch in circuit with the battery through contact 65 and conductor 72. By this connection the circuit through solenoid 35 is established from point 14 of the storage battery 10 through the solenoid 35 to contact 27, through the half-ring 17 to contact 24, to contact 65, through the blade 62 to contact 64, and back to the storage battery at the point 13. The solenoid 35 being energized, the conducting plates 49 and 47 bridge the points 43, 45 and 44, 46, respectively, closing the circuit of the pilot motor armature as follows: from the positive pole of the storage battery 10 through one blade of switch 75 to point 46, through the conducting plate 47 to point 44, through the armature 5 to point 43, through the conducting plate 49 to point 45 and back to the storage battery at point 13 through one blade of switch 75. The current flowing through the pilot armature from right to left will cause the latter to revolve in a clockwise direction, also driving shaft 2 in a clockwise direction and gradually bringing the locating switch 16 from its position corresponding to that of lever 33 standing on point 28 to its "off" position, or to that which is shown in the drawing. At the moment the switch 16 reaches this "off" position the circuit through the solenoid 35 is interrupted because of the insulating block 19 breaking the circuit between the points 27 and 24 of the locating switch. The solenoid 35 being demagnetized, its armature will drop, thus interrupting the circuit of the pilot motor armature and bringing the latter to rest. The drum of the main controller will be returned to its "off" position very quickly for the reason that the voltage impressed on the pilot armature when revolving in a clockwise direction is about twice as great as the voltage impressed on said armature when revolving in a counterclock direction. This difference in voltage is obtained by locating point 13 asymmetrically with respect to the two poles of the storage battery. Notwithstanding this quick return of the main drum-controller to its "off" position, it may happen that the driver will release the footbrake before said "off" position has been reached. Should he do so, then the connection between point 13 and contact 24 will be interrupted and the connection between point 13 and lever 33 will be reestablished with the result that the solenoid 35 will be immediately deënergized and solenoid 34 will immediately be excited. The current through the pilot armature will then be reversed and the locating switch 16 and the drum of the main controller will reverse the direction of their rotation and proceed counter-clockwise until the insulating block 19 has come to stand in its original position under contact 22. Releasing the foot-brake will also reëstablish the circuit of the main motor, but the closing of this circuit will not cause the vehicle to jerk forward, for the reason that if the brake lever has been depressed for a period of time sufficient to materially decrease the speed of the vehicle, then the locating switch 16 must have had ample time to either return to its "off" position or to have come very near to it, so that the circuit of the main motor will be reëstablished at a time when the altered position of the drum of the main controller is such as to include a sufficient amount of starting resistance in the circuit of the main motor.

In the figures, the actual connections between the main controller 15, the starting resistances, the field winding, and the armature of the main motor, have not been shown, such connections being now perfectly well understood and forming no part of this invention. For the same reason no detail of the main controller construction has been shown. While the locating switch 16 is shown as mounted directly on the shaft of the main controller, yet it is in most cases preferable to gear this switch to said shaft, for the reason that controllers as usually built are made to revolve through more than 180 degrees. The switch 75 is intended to enable the driver to disconnect his battery from both motors before leaving his vehicle, thus preventing the unauthorized handling of the latter. Point 14 can be selected in any desired manner with reference to point 13, but I prefer to so select its location as to reduce the voltage impressed on the solenoids 34 and 35 to the lowest possible value, thus minimizing the sparking at the contacts of the resetting switch end of the master controller.

The circuit arrangement shown in Fig. 2 has for its object to make it impossible for both solenoids to be simultaneously energized. This is achieved by so arranging the circuit through each solenoid that it can only be closed when the armature of the other solenoid occupies its position of rest. To this end the lead from solenoid 34 is not taken to point 14 of the battery directly, but by way of the contacts 78, 79, which are so placed as to be bridged by the contact plate 47 controlled by the solenoid 35, only when said solenoid is not energized and 47 is therefore in its position of rest. In this manner, all possibilities of short circuit, caused by the simultaneous operation of the two controlling solenoids are effectively avoided. The double pole switch 75 of Fig. 1 is replaced in Fig. 2 by the two single pole switches 80 and 81.

I claim:

1. In a control system, a main motor, a controller therefor, a master controller, a locating switch, means for actuating the main controller and locating switch, switches for determining the direction of movement of the main controller, and means in circuit with the locating switch for controlling said switches.

2. In a control system, a master controller, a governed member, a locating switch, means for actuating the governed member and the locating switch, reversing switches in circuit with the actuating means, electro-magnets in circuit with the locating switch for operating the reversing switches, and means independent of the master controller for establishing a circuit through one or the other of said electromagnets whereby the governed member will be caused to move toward its initial position.

3. In a control system, a main motor and a controller therefor, a locating switch, an auxiliary motor actuating the controller and the locating switch, said auxiliary motor and locating switch being in independent circuits, and means controlled by the circuits through the locating switch for establishing circuits through the auxiliary motor.

4. In a control system, a main motor, a controller therefor, a master controller, a locating switch, an auxiliary motor for actuating the main controller and locating switch, reversing switches for the auxiliary motor, and means in circuit with the locating switch for operating said reversing switches.

5. A master controller, a governed member, means for actuating the same, a source of energy, a locating switch having two contact members connected to the source of energy, an electromagnet in circuit with each of said contact members, reversing switches operated by said magnets, and means independent of the master controller for establishing a circuit through the locating switch and through one or the other of said magnets, whereby the governed member will be caused to move toward its initial position.

6. The combination with a vehicle, of a driving motor and a controller therefor, a brake-actuated member, an auxiliary motor actuating the controller, a locating switch, reversing switches for the auxiliary motor, means in electrical connection with the locating switch for operating the reversing switches, and means operated by the brake-actuated member for establishing a circuit through the locating switch.

7. In a control system, a main motor, a controller therefor, a locating switch having a contact member movable with the controller, means for actuating the locating switch and the controller, two reversing switches for controlling the actuating means and means in circuit with the locating switch and with a contact of one of the reversing switches for actuating the other reversing switch.

8. In a control system, a governed member, means for actuating the same, reversing switches for the actuating means, a source of energy, a locating switch having two contact members each connected to the source of energy, a separate electro-magnet for operating each reversing switch, each electro-magnet being in circuit with a contact member of the locating switch and with a contact of a reversing switch.

9. In a control system, a governed member, means for actuating the same, a source of energy, a locating switch having two contact members each connected to the source of energy, a separate electro-magnet in circuit with each of said contact members, each electro-magnet being provided with means for rendering the other inoperative.

In testimony whereof, I have hereunto set my hand and affixed my seal in the presence of the two subscribing witnesses.

VALÈRE ALFRED FYNN. [L. S.]

Witnesses:
 W. A. ALEXANDER,
 GEORGINE SHORE.

Copies of this patent may be obtained for five cents each, by addressing the "Commissioner of Patents, Washington, D. C."